United States Patent
Bouda

(10) Patent No.: US 8,041,217 B2
(45) Date of Patent: Oct. 18, 2011

(54) SYSTEM AND METHOD FOR MANAGING WAVELENGTH DRIFT IN AN OPTICAL NETWORK

(75) Inventor: Martin Bouda, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 851 days.

(21) Appl. No.: 11/945,590

(22) Filed: Nov. 27, 2007

(65) Prior Publication Data

US 2009/0136230 A1 May 28, 2009

(51) Int. Cl.
  *H04J 4/00* (2006.01)
(52) U.S. Cl. .................. 398/75; 398/9; 398/17; 398/23; 398/36; 398/66; 398/69; 398/74; 398/95; 398/100
(58) Field of Classification Search ............... 398/66–91, 398/98–102, 9, 17, 23, 36, 96; 370/398, 370/442
See application file for complete search history.

(56) References Cited

U.S. PATENT DOCUMENTS

| | | | | |
|---|---|---|---|---|
| 6,411,410 B1 * | 6/2002 | Wright et al. | ................... | 398/79 |
| 6,798,781 B1 * | 9/2004 | Hill | ................................ | 370/398 |
| 7,120,360 B2 * | 10/2006 | Tian et al. | ........................ | 398/83 |
| 2002/0109892 A1 * | 8/2002 | Seto et al. | ...................... | 359/180 |
| 2002/0150329 A1 * | 10/2002 | Ahn et al. | ........................ | 385/24 |
| 2003/0179769 A1 * | 9/2003 | Shi et al. | ........................ | 370/442 |
| 2006/0002706 A1 * | 1/2006 | Lee et al. | ........................ | 398/71 |
| 2008/0037990 A1 * | 2/2008 | Effenberger | .................... | 398/67 |
| 2008/0267627 A1 * | 10/2008 | Effenberger | .................... | 398/72 |

* cited by examiner

*Primary Examiner* — Li Liu
(74) *Attorney, Agent, or Firm* — Baker Botts L.L.P.

(57) ABSTRACT

In accordance with the teachings of the present invention, a system and method for managing wavelength drift in an optical network is provided. In a particular embodiment, the method includes receiving traffic in one or more optical channels transmitted by one or more transmitters, each channel having successive timeslots, each transmitter assigned to transmit in a channel in allocated timeslots in the channel. The method also includes determining whether the traffic received in a particular channel in a particular timeslot was transmitted by one of the transmitters that was not assigned to transmit in the particular channel. The method further includes, if the traffic in the particular channel was transmitted by one of the transmitters that was not assigned to transmit in the particular channel, identifying the transmitter that was not assigned to transmit but that did transmit in the particular channel, assigning the identified transmitter to transmit in the particular channel, and allocating timeslots in the particular channel to the identified transmitter.

12 Claims, 6 Drawing Sheets

| | 320 | 330 | 340 | 350 | 118 |
|---|---|---|---|---|---|
| | ONU SERIAL NUMBER | ONU-ID | TRANSMITTER TXIF NUMBER | RECEIVER RXIF NUMBER | |
| 310a | SN A | ONU A | TX | RX A | |
| 310b | SN B | ONU B | TX | RX B | |
| 310c | SN C | ONU C | TX | RX B | |
| ⋮ | ⋮ | ⋮ | ⋮ | ⋮ | |
| 310N | SN N | ONU N | TX | RX M | |

*FIG. 6*

| | 320 | 330 | 340 | 350 | 118 |
|---|---|---|---|---|---|
| | ONU SERIAL NUMBER | ONU-ID | TRANSMITTER TXIF NUMBER | RECEIVER RXIF NUMBER | |
| 310a | SN A | ONU A | TX | RX A | |
| 310b | SN B | ONU B | TX | RX B | |
| 310c | SN C | ONU C | TX | RX B | |
| ⋮ | ⋮ | ⋮ | ⋮ | ⋮ | |
| 310N | SN N | ONU N | TX | RX M-1 | |

*FIG. 7*

SYSTEM AND METHOD FOR MANAGING WAVELENGTH DRIFT IN AN OPTICAL NETWORK

TECHNICAL FIELD

The present invention relates generally to communication systems and, more particularly, to a system and method for managing wavelength drift in an optical network.

BACKGROUND

A general goal of communication systems, including optical networks, is to provide greater bandwidth to satisfy ever-increasing demand. In optical networks, greater bandwidth may be provided using new technologies such as wavelength division multiplexing (WDM). Optical networks using WDM combine optical traffic in multiple wavelengths (assigned to multiple corresponding communication channels) into one signal and may transmit the combined signals to a particular destination. At the destination, the traffic in each wavelength may be directed based on wavelength to a separate receiver and processed. If the wavelength at which a transmitter transmits has drifted into a channel to which the transmitter was not assigned, collisions in traffic from other transmitters and/or other signaling disruptions may occur.

SUMMARY

In accordance with the teachings of the present invention, a system and method for managing wavelength drift in an optical network is provided. In a particular embodiment, the method includes receiving traffic in one or more optical channels transmitted by one or more transmitters, each channel having successive timeslots, each transmitter assigned to transmit in a channel in allocated timeslots in the channel. The method also includes determining whether the traffic received in a particular channel in a particular timeslot was transmitted by one of the transmitters that was not assigned to transmit in the particular channel. The method further includes, if the traffic in the particular channel was transmitted by one of the transmitters that was not assigned to transmit in the particular channel, identifying the transmitter that was not assigned to transmit but that did transmit in the particular channel, assigning the identified transmitter to transmit in the particular channel, and allocating timeslots in the particular channel to the identified transmitter.

Technical advantages of one or more embodiments of the present invention may include providing increased bandwidth cost-effectively by managing wavelength drift. By managing wavelength drift, network operators may use proven, less expensive technologies in their networks that permit wavelength drift to occur. For example, particular embodiments may use less-expensive, temperature-sensitive transmitters to transmit traffic. If wavelength drift occurs, these embodiments may dynamically manage the wavelength drift and avoid collisions and/or other signaling disruptions. By managing wavelength drift instead of seeking to constrain it with more-expensive transmitters, these embodiments may be more cost-effective.

Another technical advantage of one or more embodiments of the present invention may include minimizing any cost increase of cost-sensitive components in a passive optical network (PON) by managing wavelength drift. Network operators may desire to upgrade PONs to accommodate upstream transmission in multiple channels by cost-sensitive optical network units (ONUs). By managing ONU wavelength drift instead of seeking to eliminate this wavelength drift in part or all of the network, network operators may use less-expensive ONUs having temperature-sensitive transmitters that permit wavelength drift. More-expensive ONUs having temperature-insensitive transmitters that constrain wavelength drift need not be required. In this manner, network operators may minimize any cost increase in cost-sensitive ONUs.

Yet another technical advantage of one or more embodiments of the present invention may include increasing the number and spectral density of WDM channels in an optical network, thereby increasing the bandwidth capacity of the network. Some optical networks may address wavelength drift by increasing the width of each receiver channel to match or exceed the expected wavelength drift of each corresponding transmitter. However, where the available wavelength range is limited, increasing the width of each receiver channel necessarily reduces the number of channels in the network, thereby reducing the transmission capacity of the network. Particular embodiments may avoid this result by managing wavelength drift.

A further technical advantage of one or more embodiments of the present invention may include seamless or near seamless signaling, even as wavelength drift occurs, by managing any drift. Seamless or near seamless signaling may be achieved by dynamically determining, for example, that an ONU's traffic has drifted into a non-assigned channel (because the wavelength at which the ONU transmits has drifted), assigning that ONU to the new channel, and allocating timeslots in the new channel to the ONU. Seamless or near seamless signaling avoids undesirable disruptions in communication, including, for example, re-initializations of transmitting ONUs.

Still another technical advantage of one or more embodiments of the present invention may include encouraging the wavelengths at which node transmitters transmit to drift to distribute bandwidth more efficiently. For example, particular embodiments may encourage drift to distribute a particular subset of premium WDM traffic to channels providing greater bandwidth. Other embodiments may encourage drift to distribute traffic more evenly across channels. Still further embodiments may encourage drift to avoid disrupted channels. In yet further embodiments, drift may be encouraged for any other suitable reason. Drift may be encouraged, for example, by affecting the temperatures at which the transmitters transmit traffic.

It will be understood that the various embodiments of the present invention may include some, all, or none of the enumerated technical advantages. In addition other technical advantages of the present invention may be readily apparent to one skilled in the art from the figures, description, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 6 is a diagram illustrating the example reachability table of FIG. 2 for timeslot $T_3$ of FIG. 3 after wavelength drift has been managed according to the method of FIG. 5; and FIG. 7 is a diagram illustrating the example reachability table of FIG. 2 for timeslot $T_5$ of FIG. 3 after wavelength drift has been managed according to the method of FIG. 5.

DETAILED DESCRIPTION

Figure 1:
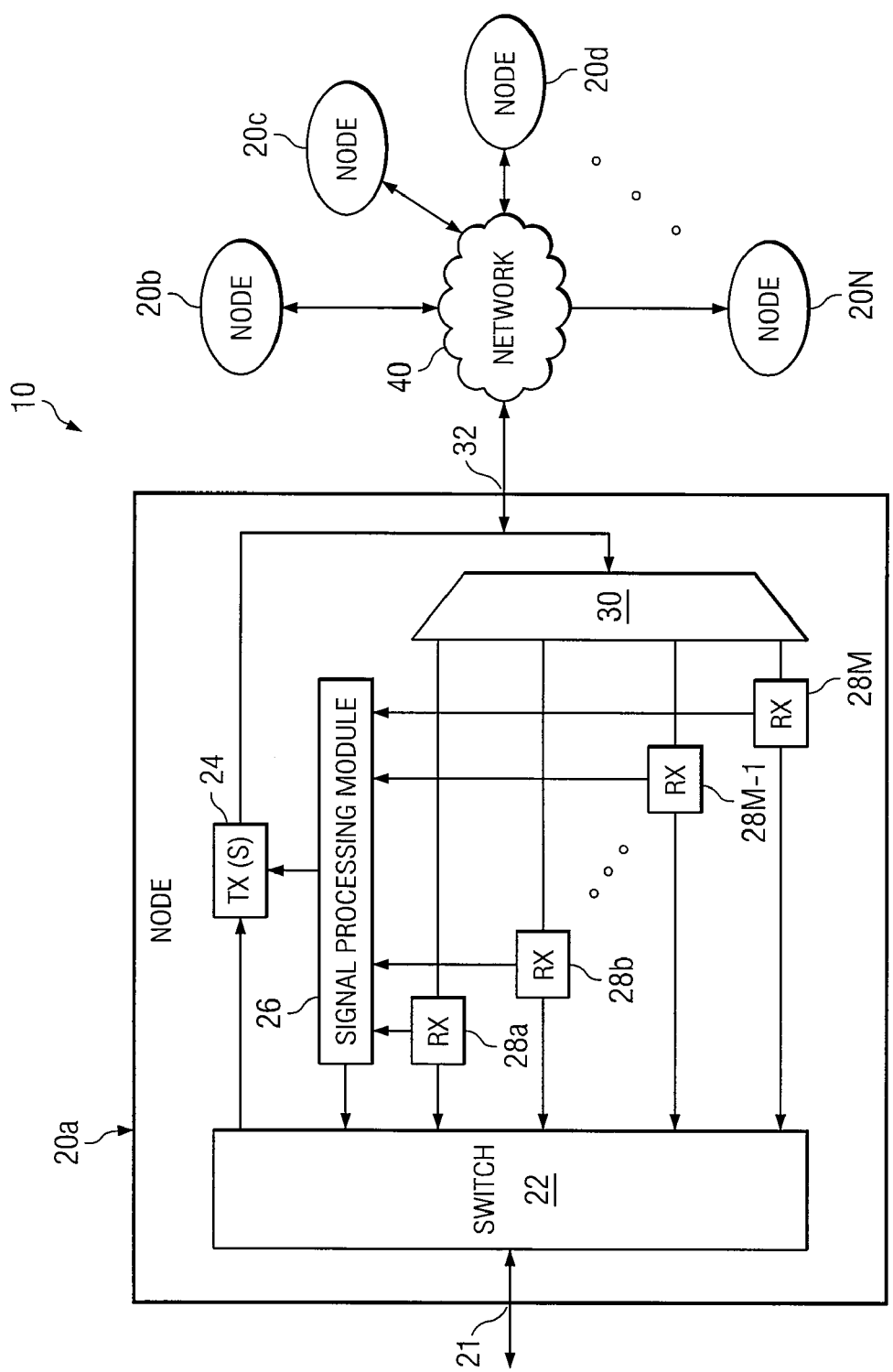
FIG. 1 is a diagram illustrating an example optical network logical topology managing wavelength drift according to a particular embodiment of the invention.

FIG. 1 is a diagram illustrating an example optical network logical topology 10 managing wavelength drift according to a particular embodiment of the invention. Example optical network logical topology 10 comprises nodes 20a-20N and network 40. Each node 20 is connected to network 40 and can receive traffic in one or more channels. As described further below, in particular embodiments, each node 20 that can receive traffic in more than one channel is operable to manage wavelength drift that may occur across those channels.

Node 20a comprises port 21, switch 22, transmitter(s) 24, signal processing module 26, receivers 28a-28M, demultiplexer 30, and port 32. Node 20a may be connected to one or more other network devices (not illustrated) through port 21 and is operable to receive network traffic from and/or forward network traffic to any one or more of these devices. In alternative embodiments, node 20a may be connected to these devices through any suitable number of ports and not necessarily a single port. In yet alternative embodiments, node 20a may not be connected to these devices and may not comprise port 21.

Switch 22 may comprise any suitable component operable to route incoming network traffic from port 21 or from one or more receivers 28a-28M to the one or more transmitter(s) 24. Switch 22 may route this traffic to the one or more transmitter(s) 24 based on traffic identifiers (e.g., a virtual local area network (VLAN) or Ethernet Media Access Control (MAC) address) and transmitter-node association information received from signal processing module 26, as discussed further below. In particular embodiments, switch 22 may also receive traffic from each receiver 28 and forward the traffic to port 21. In alternative embodiments comprising multiple ports 21, switch 22 may switch incoming bursts to corresponding ports depending on the destination of those bursts. In particular embodiments, node 20a may not comprise switch 22.

Transmitter(s) 24 may comprise any suitable transmitter(s) operable to receive traffic from switch 22 and other routing information from signal processing module 26 and transmit the traffic and, optionally, the routing information to port 32, as discussed further below. In particular embodiments, transmitter(s) 24 may receive an upstream bandwidth allocation map from signal processing module 26 updated to manage wavelength drift across multiple channels. Transmitter(s) 24 may then transmit traffic from switch 22, the upstream bandwidth allocation map, and/or other routing information. It should be noted that in particular embodiments, node 20a may comprise a single transmitter 24. In alternative embodiments, node 20a may comprise multiple transmitters 24. In these alternative embodiments, a combiner such as, for example, a multiplexer, may be used in node 20a to combine the traffic from transmitters 24 and forward the combined traffic to port 32.

Signal processing module 26 may comprise any suitable set of one or more components operable to store information about what nodes 20 in topology 10 are assigned to transmit in what downstream and upstream channels. Signal processing module 26 is further operable to receive traffic information from these nodes (via port 32, demultiplexer 30, and receivers 28) and determine whether the wavelengths at which these nodes 20 transmit have drifted to non-assigned channels. Signal processing module 26 may determine that wavelength drift has occurred, at least in part, by detecting noise or (partial) frame corruption in a channel, an indicator that traffic has collided in the channel. Collisions may occur, for example, if a node 20b-20N transmits traffic in a non-assigned channel in the same timeslot as another node 20b-20N assigned to that channel for that timeslot.

It should be noted that, in particular embodiments, signal processing module 26 may optionally employ information on transmitter wavelength or information related to transmitter wavelength, such as, for example, transmitter temperature, environmental temperature, transmitter junction voltage, or transmitter bias current obtained from transmitter node 20, to confirm drift into a channel. Signal processing module 26 may also use information samples collected from local or remote sources to predict drifting into a channel and preemptively schedule time slots in any suitable manner to avoid collisions.

After determining that a node 20 has transmitted in a non-assigned channel, signal processing module 26 is operable to determine the identity of the node 20 that has transmitted in the non-assigned channel and the new channel in which that node 20 is transmitting traffic. Signal processing module 26 may alternatively determine that a node 20 has transmitted in a non-assigned channel and identify the node 20 that has transmitted in the non-assigned channel, at least in part, by detecting in the received traffic a node identifier identifying the node 20 that transmitted the traffic, and determining that the node 20 that transmitted the traffic was not assigned to the channel. It should be noted that in alternative embodiments, signal processing module 26 may operate in any other suitable manner to determine that the wavelength at which a node 20 transmits has drifted to a non-assigned channel and to identify the node 20 whose wavelength has drifted to the non-assigned channel and the new channel in which that node 20 is transmitting traffic.

After determining the identity of the node 20 whose traffic has drifted to a non-assigned channel and the new channel in which that node 20 is transmitting traffic, signal processing module 26 is operable to use this information to update its records regarding what nodes 20 are assigned to transmit in what channels. Signal processing module 26 is further operable to generate one or more channel bandwidth allocation maps for channels receivable by receivers 28, based on the updated information. These bandwidth allocation maps may reflect, for example, that one more node 20 (the one whose wavelength has drifted) shares upstream time slots in the new channel, and one less node 20 shares upstream time slots in the old channel. Signal processing module 26 is operable to send the channel bandwidth allocation map(s) to switch 22 and/or transmitter(s) 24 for forwarding to nodes 20b-20N.

Signal processing module 26 is further operable to send any other suitable information (e.g., a bandwidth allocation map from one or more of the other nodes 20b-20N for transmitting traffic to those nodes 20b-20N) to switch 22 and/or transmitter(s) 24.

It should be noted that in alternative embodiments, a node comprising signal processing module 26 may, instead of re-allocating channel bandwidth to accommodate a node transmitter transmitting in a non-assigned channel, request that the node (e.g, temporarily) shut off the transmitter whose wavelength has drifted into a non-assigned channel. Such a result may be acceptable, for example, if the node includes multiple transmitters. It should also be noted that, in alternative embodiments with distributed schemes for channel bandwidth allocation, the channel bandwidth allocation maps sent to other nodes 20 may be based on channel bandwidth allocation information received from other nodes 20.

Receivers 28a-28M comprise any suitable receivers operable to receive traffic from nodes 20b-20N (via port 32 and demultiplexer 30), process the received traffic, and forward the processed traffic to signal processing module 26 and/or switch 22. It should be noted that receivers 28 may comprise broadband receivers or any other suitable type of receivers. It should also be noted that a receiver 28 may receive an unintelligible signal (i.e., noise) when traffic transmitted by a node 20 drifts into a non-assigned channel in a timeslot in which other traffic is being communicated to that receiver 28. An unintelligible signal may arise because the drifted traffic collides with the other traffic in the channel. Receiver 28 may also detect and process intelligible traffic, which may identify that a node 20b-20N is transmitting the traffic in a non-assigned channel.

Demultiplexer 30 comprises any suitable demultiplexer or other filtering device or set of devices that receives a signal from nodes 20b-20N (via port 32) and demultiplexes the signal into channels corresponding to the output ports of demultiplexer 30. Demultiplexer 30 is further operable to forward any portion of the signal in the first channel to receiver 28a, any portion of the signal in the second channel to receiver 28b, and so on. When wavelength drift occurs, the traffic transmitted by a node 20 drifts from being transmitted in an assigned channel (corresponding to one output port of demultiplexer 30) to a non-assigned channel (corresponding to another output port of demultiplexer 30).

Figure 1A:
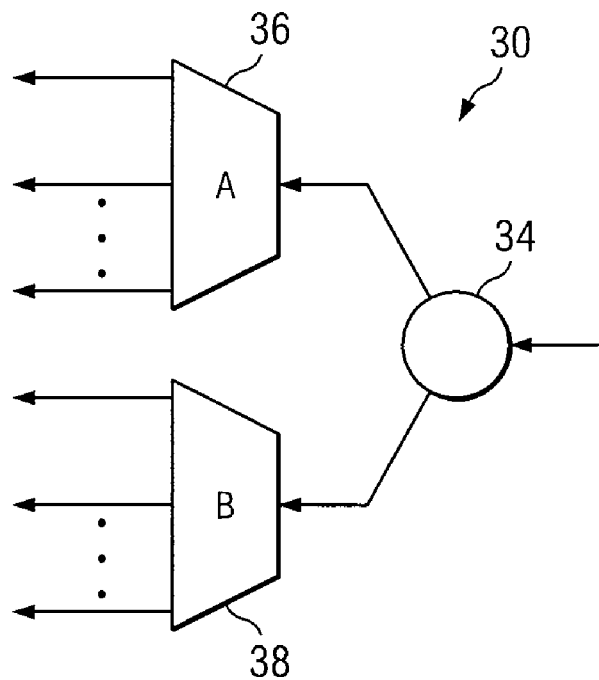
FIG. 1A is a diagram illustrating the example demultiplexer of FIG. 1 according to an alternative embodiment of the invention.
Figure 1B:
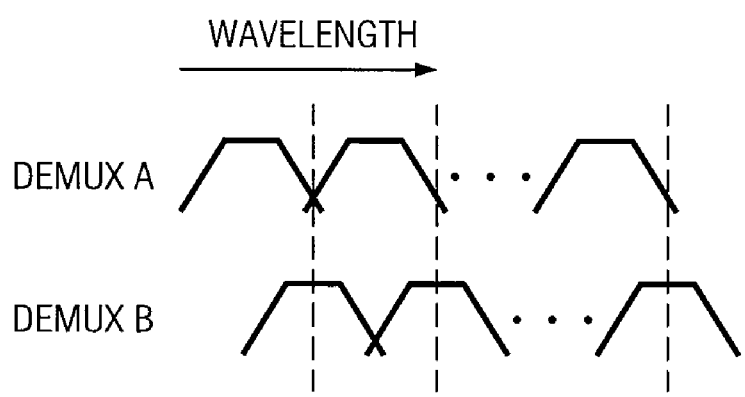
FIG. 1B is a diagram illustrating example channel characteristics of the example demultiplexer of FIG. 1A according to a particular embodiment of the invention.

It should be noted that, in alternative embodiments, demultiplexer 30 may comprise any combination of suitable devices or optical components configured to provide multiple optical passbands. For example, as illustrated in FIG. 1A, demultiplexer 30 may comprise a power splitter 34 coupled to two demultiplexers 36 and 38 (also referred to in FIG. 1A as demultiplexers A and B, respectively). Power splitter 34 may be configured to receive an incoming signal from port 32, split the signal into two copies (of, e.g., approximately equal power), and forward a copy to each demultiplexer 36 and 38. Each demultiplexer 36 and 38 may be configured to demultiplex the received copy such that the approximate centers of passbands of the demultiplexer are aligned with the edges of the passbands of the other demultiplexer, as illustrated in FIG. 1B. It should be noted that demultiplexer 30 may comprise any other suitable component or set of components in alternative embodiments.

Node 20a may be connected to network 40 through a single port 32. In alternative embodiments, node 20a may be connected to network 40 through more than one port. From port 32 (or any other suitable ports), node 20a may receive network traffic from and/or forward network traffic to nodes 20b-20N via network 40. Node 20a may receive traffic in a plurality of channels corresponding to the output ports of demultiplexer 30. Node 20a may manage any traffic drift across these channels, as described more fully below.

Network 40 may comprise any suitable network component or set of components connected to nodes 20a-20N and operable to forward traffic among nodes 20a-20N. Network 40 may, for example, forward traffic from node 20a to nodes 20b-20N in one or more channels and traffic from nodes 20b-20N to node 20a in multiple channels. In particular embodiments, network 40 may also forward traffic from any one or more of nodes 20 to any other node 20 in one or multiple channels. In particular embodiments, network 40 may be part of a passive optical network, as described further below in conjunction with FIG. 2. In alternative embodiments, network 40 may be part of any other suitable type of network. Network 40 may comprise combining and/or splitting components such as, for example, multiplexers, filters, or couplers. In particular embodiments, network 40 may also comprise switches and other suitable components. Network 40 may be connected to nodes 20a-20N in any suitable manner, including, for example, via any suitable optical component such as optical fiber, and via any physical interconnection realizing a logical connectivity as illustrated in FIG. 1.

In particular embodiments, each node 20b-20N may be the same as node 20a and transmit traffic in one or more channels and be configured to receive traffic in multiple channels and thus will not be described again in detail. It should be noted, however, that nodes 20b-20N may use the channel bandwidth allocation maps forwarded to them by node 20a and by any other nodes 20 forwarding upstream bandwidth allocation maps (and vice versa) for suitable transmission. It should also be noted that, in alternative embodiments, one or more of nodes 20b-20N may use more, fewer, and/or other components or functionality than that used in node 20a. For example, node 20a may be the only node in particular embodiments that is configured to receive traffic in multiple channels and manage drift across the channels. In alternative embodiments, one or more (including all) of nodes 20b-20N may be configured to receive traffic in multiple channels and manage drift across the channels, as does node 20a.

In the operation of particular embodiments, switch 22 of node 20a receives network traffic from one or more network devices (not illustrated) via port 21. Switch 22 routes the network traffic to the one or more transmitter(s) 24 in any suitable manner. Transmitter(s) 24 receive the traffic from switch 22 and other routing information, such as an upstream bandwidth allocation map and downstream routing information, from signal processing module 26 and transmit (e.g., based on the downstream routing information) the traffic and upstream bandwidth allocation map to nodes 20b-20N via port 32 and network 40.

In the upstream direction from the perspective of node 20a, network 40 forwards traffic from nodes 20b-20N in one or more channels to node 20a. Demultiplexer 30 of node 20a receives a signal from nodes 20 (via port 32) and demultiplexes the signal into channels corresponding to the output ports of demultiplexer 30. Demultiplexer 30 forwards any portion of the signal in the first channel to receiver 28a, any portion of the signal in the second channel to receiver 28b, and so on. Receivers 28a-28M receive traffic in the different channels from demultiplexer 30, process the received traffic, and forward the processed traffic to switch 22 and signal processing module 26.

Switch 22 receives the traffic from each receiver 28 and forwards the traffic to one or more upstream network devices (not illustrated) via port 21. Signal processing module 26 also receives traffic information from receivers 28. Using stored information about what nodes 20b-20N are assigned to transmit in what upstream channels, signal processing module 26 then determines whether, for one or more of these nodes 20b-20N, their traffic has drifted to non-assigned channels, identifies each node 20 whose traffic has drifted to a non-assigned channel, and identifies the new channel(s) in which that node 20 is transmitting. After identifying each node 20 whose traffic has drifted to a non-assigned channel and the new channel(s) in which that node 20 is transmitting, signal processing module 26 uses this information to assign those nodes to those channels in its records. Signal processing module 26 generates one or more channel bandwidth allocation maps based on the updated information. Signal processing module 26 sends the channel bandwidth allocation map(s) and any other suitable information (e.g., a channel bandwidth allocation map from one or more of the other nodes 20b-20N) to transmitter(s) 24. Transmitter(s) 24 use this information as discussed above. In this manner, wavelength drift can be managed effectively.

Modifications, additions, or omissions may be made to the example systems and methods described without departing from the scope of the invention. The components of the example methods and systems described may be integrated or separated according to particular needs. Moreover, the operations of the example methods and systems described may be performed by more, fewer, or other components.

Figure 2:
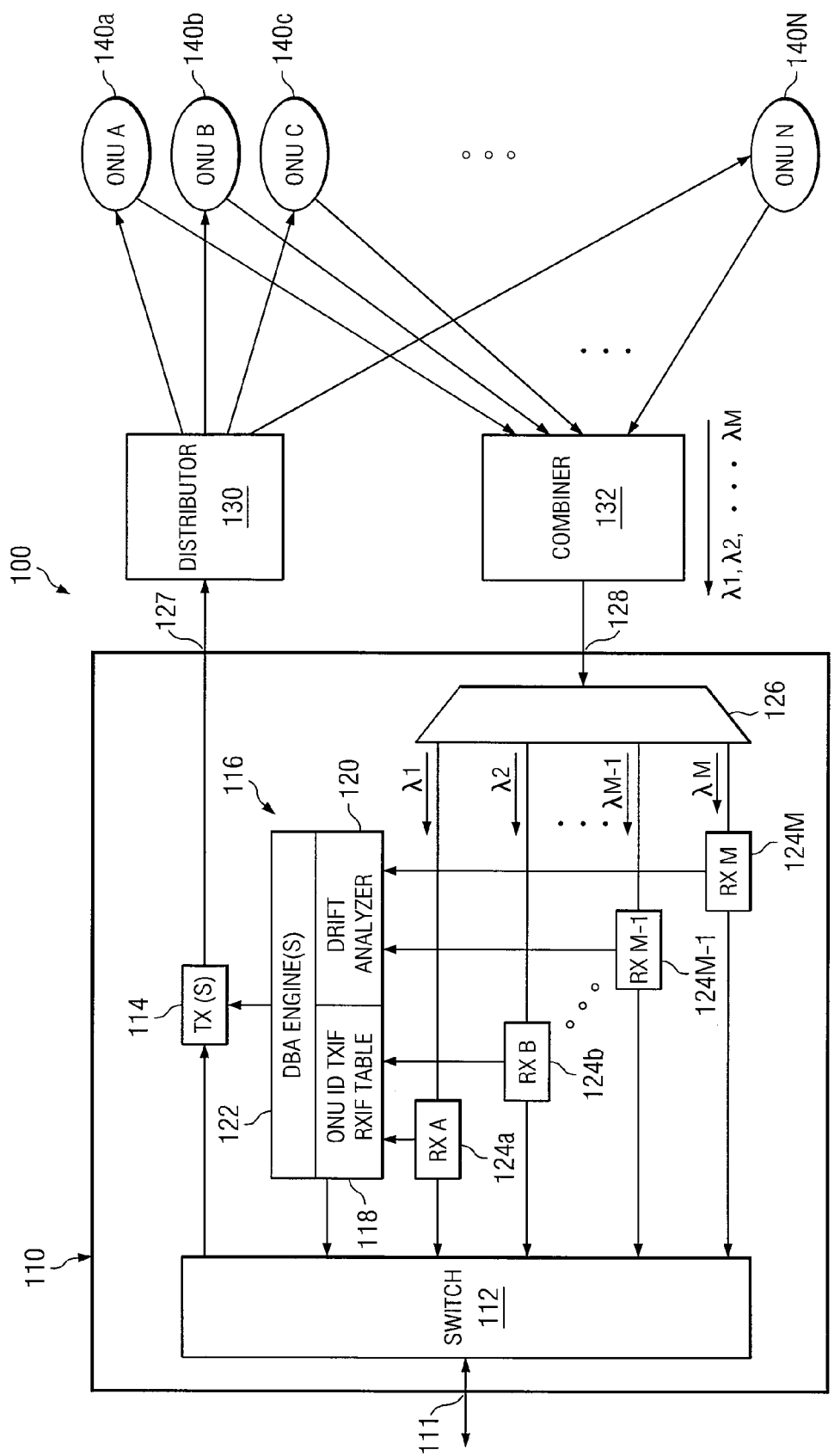
FIG. 2 is a diagram illustrating an example passive optical network logical topology managing wavelength drift according to a particular embodiment of the invention.

FIG. 2 is a diagram illustrating an example passive optical network (PON) logical topology 100 managing wavelength drift according to a particular embodiment of the invention. Example PON logical topology 100 comprises any suitable PON where an optical line terminal (OLT) is configured to receive upstream traffic from downstream optical network units (ONUs) in a plurality of channels. When traffic in one channel drifts into a non-assigned channel, PON logical topology 100 manages that drift by re-assigning channels to accommodate the drift. Reference is made to U.S. patent application entitled "System and Method for Transmitting Upstream Traffic in an Optical Network," Ser. No. 11/426,875 filed Jun. 27, 2006, and U.S. patent application entitled "System and Method for Transmitting Upstream WDM Traffic in a Passive Optical Network," Ser. No. 60/869,508 filed Dec. 11, 2006, for example PONs, including power-splitting PONs (PSPONs), hybrid PONs (HPONs), and WDM PONs (WDMPONs), where an OLT is configured to receive upstream traffic from ONUs in a plurality of channels.

Example PON logical topology 100 comprises OLT 110, distributor 130, combiner 132, and ONUs 140a-140N (also referred to in the FIGURES as "ONU A" through "ONU N"). OLT 110 comprises port 111, switch 112, transmitter(s) 114, signal processing module 116, receivers 124a-124M (also referred to in the FIGURES as "RX A" through "RX M"), demultiplexer 126, and ports 127 and 128. OLT 110 is an example of an upstream terminal or node and may reside at the carrier's central office, where it may be coupled to a larger communication network via port 111 (or via multiple ports).

Switch 112 of OLT 110 may comprise any suitable component operable to route incoming network traffic from port 111 to the one or more transmitter(s) 114. Switch 112 may route this traffic to the one or more transmitter(s) 114 based on traffic identifiers (e.g., virtual local area network (VLAN) or Ethernet Media Access Control (MAC) address) and transmitter-ONU association information stored in and received from signal processing module 116, as discussed further below. Switch 112 may also receive upstream traffic from each receiver 124 in particular embodiments and forward the traffic to port 111. In alternative embodiments comprising multiple ports 111 (not illustrated), upstream bursts may be switched to corresponding ports 111 depending on the destination of those bursts.

Transmitter(s) 114 may comprise any suitable transmitter(s) operable to receive traffic from switch 112 and other routing information from signal processing module 116 and transmit the traffic to port 127, as discussed further below. In particular embodiments, transmitter(s) 114 may receive upstream bandwidth allocation map(s) from signal processing module 116 updated to manage wavelength drift across channels. Transmitter(s) 114 may then transmit these map(s) and/or other routing information and traffic from switch 112 to ONUs 140 in any suitable manner.

It should be noted that in particular embodiments, OLT 110 may comprise a single transmitter 114 or a plurality of transmitters 114 that broadcast traffic to all downstream ONUs 140 (e.g., as in a PSPON). In alternative embodiments, OLT 110 may comprise a plurality of transmitters 114, where each of two or more of those transmitters 114 forwards its traffic only to a subset of downstream ONUs 140 (e.g., as in an HPON or WDMPON). In these embodiments, OLT 110 may use a combiner such as, for example, a multiplexer, to combine the downstream traffic from the multiple transmitters 114 and forward the combined traffic to port 127.

Signal processing module 116 comprises ONU-ID-TXIF-RXIF reachability table 118, drift analyzer 120, and dynamic bandwidth allocation (DBA) engine(s) 122. Reachability table 118 comprises any suitable table or other collection of data operable to store information about what ONUs 140 (using, e.g., ONU identifiers) are assigned to transmit in what downstream channels (using, e.g., a transmitter interface identifier) and upstream channels (using, e.g., a receiver interface identifier).

Drift analyzer 120 comprises any suitable device operable to receive traffic information from ONUs 140 (via port 128, demultiplexer 126, and receivers 124) and determine whether one or more of these ONUs 140 has transmitted in a non-assigned channel. For example, drift analyzer 120 may determine that an ONU 140 is transmitting in a non-assigned channel (i.e., that wavelength drift has occurred) at least in part by detecting noise or (partial) frame corruption in a channel. The noise may comprise, for example, a signal of collided traffic after an ONU's traffic drifts into a non-assigned channel in a timeslot in which another ONU 140 is transmitting in that channel.

It should be noted that, in particular embodiments, drift analyzer 120 may optionally employ information on transmitter wavelength or information related to wavelength such as transmitter temperature, environmental temperature, transmitter junction voltage, or transmitter bias current obtained from ONUs 140, to confirm drift into a channel. Drift analyzer 120 may also use information samples collected from local or remote sources to predict drifting into a channel and preemptively schedule time slots in any suitable manner to avoid collisions.

After determining that an ONU 140 is transmitting in a non-assigned channel, drift analyzer 120 is operable to determine the identity of the ONU 140 with the drifted wavelength by, for example, detecting the absence of traffic in another channel in a timeslot assigned for transmission by an ONU 140. Drift analyzer may determine that that ONU's traffic has drifted and collided with the traffic of the ONU 140 that was assigned transmission in the noise-filled channel in that timeslot.

Drift analyzer 120 may also be operable to determine that an ONU 140 has transmitted in a non-assigned channel when an intelligible signal is received. For example, drift analyzer 120 may determine that wavelength drift has occurred when drift analyzer 120 detects (and identifies) traffic from an ONU 140 in a non-assigned channel (using, e.g., ONU identifiers in the traffic). It should be noted that in alternative embodiments, drift analyzer 120 may operate in any other suitable manner to determine that an ONU's traffic has drifted to a non-assigned channel and to identify the ONU 140 whose traffic has drifted and the new channel in which that ONU 140 is transmitting. After identifying the ONU 140 whose traffic has drifted and the new channel in which that ONU 140 is transmitting traffic, drift analyzer 120 is operable to use this information to update what ONUs 140 are assigned to transmit in what channels in reachability table 118. The ONUs 140 with the drifted traffic are reassigned from their old channels to the new channels.

DBA engine(s) 122 may comprise one or more DBA engines operable to dynamically generate one or more upstream bandwidth allocation maps (for upstream transmission by ONUs 140) based on the information in reachability table 118. After drift analyzer 120 detects that an ONU 140 is transmitting in a non-assigned channel and updates reachability table 118 to manage this drift in traffic, DBA engine(s) 122 may use the updated information in reachability table 118 to generate upstream bandwidth allocation map(s) that allocate timeslots in a channel to the ONU 140 whose traffic has drifted into that channel. Also, these maps may not allocate any timeslots to that ONU 140 in the channel from which it has drifted. DBA engine(s) 122 are operable to send the upstream bandwidth allocation map(s) to switch 112 and/or transmitter(s) 114.

Receivers 124 comprise any suitable receivers operable to receive traffic from ONUs 140 (via port 128 and demultiplexer 126), process the received traffic, and forward processed traffic information to signal processing module 116 and/or switch 112. In the illustrated embodiment, receiver 124a receives traffic in channel 1 (corresponding to wavelength band $\lambda_1$), receiver 124b receives traffic in channel 2 (corresponding to wavelength band $\lambda_2$), and so on. It should be noted that receivers 124 may comprise broadband receivers or any other suitable type of receivers. It should also be noted that a receiver 124 may receive a signal with unintelligible traffic (i.e., noise) when traffic drifts into the channel received by the receiver and collides with other traffic in that channel. Receiver 124 may also detect and process intelligible traffic, which may identify an ONU 140 transmitting the traffic in a non-assigned channel.

Demultiplexer 126 comprises any suitable demultiplexer or other filtering device or set of devices that receives a signal from ONUs 140 (via port 128 and combiner 132) and demultiplexes the signal into channels corresponding to the output ports of demultiplexer 126. Demultiplexer 126 is further operable to forward any portion of the signal in the first channel (wavelength band $\lambda_1$) to receiver 124a, any portion of the signal in the second channel (wavelength band $\lambda_2$) to receiver 124b, and so on. When traffic drifts to a non-assigned channel, the wavelength transmitted by an ONU 140 drifts from an assigned channel (corresponding to one output port of demultiplexer 126) to a non-assigned channel (corresponding to another output port of demultiplexer 126).

It should be noted that, in alternative embodiments, demultiplexer 126 may comprise any combination of suitable devices or optical components configured to provide multiple optical passbands. For example, demultiplexer 126 may comprise a power splitter coupled to two demultiplexers (similarly to demultiplexer 30 illustrated in FIG. 1A). The power splitter may be configured to receive an incoming signal from port 128, split the signal into two copies (of, e.g., approximately equal power), and forward a copy to each demultiplexer. Each demultiplexer may be configured to demultiplex the received copy such that the approximate centers of passbands of the demultiplexer are aligned with the edges of the passbands of the other demultiplexer (similarly to what is illustrated in FIG. 1B). It should be noted that demultiplexer 126 may comprise any other suitable component or set of components in alternative embodiments.

In the illustrated embodiment in FIG. 2, OLT 110 is connected to distributor 130 via port 127 and to combiner 132 via port 128. In alternative embodiments, OLT 110 may be connected to distributor 130 and combiner 132 via any other suitable number of ports, including a single port. These port(s) may be connected to distributor 130 and combiner 132 via optical fiber or other suitable optical components.

Distributor 130 comprises any suitable device operable to receive a signal from OLT 110 and distribute that signal or a particular component of that signal to all or a subset of ONUs 140. For example, in particular PSPON embodiments, distributor 130 may comprise a set of one or more splitters operable to receive a signal from OLT 110, split that signal into a number of copies, and forward a copy to each ONU 140. In particular HPON or WDMPON embodiments, distributor 130 may comprise a set of one or more wavelength routers (e.g., demultiplexers or suitable sets of filters) and/or a set of one or more splitters. Distributor 130 may be operable to receive a signal from OLT 110, forward some or all wavelength components to the wavelength router(s) for forwarding to certain subsets of one or more ONUs 140, and optionally forward other wavelength components to one or more splitter(s) for forwarding to all ONUs 140. Distributor 130 may be connected to ONUs 140 via optical fiber or other suitable optical components.

Combiner 132 comprises any suitable device operable to receive traffic in a plurality of channels from ONUs 140, combine the traffic, and forward the traffic to OLT 110. In particular embodiments, combiner 132 may comprise one or more couplers (i.e., splitters). In alternative embodiments, combiner 132 may comprise one or more wavelength routers (i.e., multiplexers) or other set of filters. In yet alternative embodiments, combiner 132 may comprise a combination of one or more couplers and one or more wavelength routers. Combiner 132 may be connected to ONUs 140 via optical fiber or other suitable optical components.

It should be noted that, in particular embodiments, distributor 130 and combiner 132 may be located in a remote node (RN) that is remote from OLT 110 and ONUs 140. Also, the components and/or functionality of distributor 130 and combiner 132 may be integrated.

Each ONU 140 is an example of a downstream node or terminal and comprises any suitable device operable to receive and process downstream traffic and other routing information from OLT 110 (via distributor 130). For example, each ONU 140 is operable to receive and process upstream bandwidth allocation map(s) forwarded by OLT 110. Each ONU 140 is further operable to transmit upstream traffic to OLT 110 (via combiner 132) based on, for example, those upstream bandwidth allocation map(s). To receive and transmit this traffic, each ONU 140 may comprise one or more receivers and transmitters (not illustrated). In particular embodiments, each ONU transmitter may comprise any suitable transmitter operable to transmit upstream traffic within a particular wavelength band. For at least one ONU 140 in topology 100, that band may extend into two or more channels, and the channel in which that ONU 140 transmits may depend, for example, on the ONU's operating temperature. If an ONU's wavelength band extends into two or more channels, the possibility exists that the wavelength at which the ONU transmits will drift from an assigned channel to a non-assigned channel.

Although more expensive, temperature-insensitive transmitters may be used to limit the wavelength at which an ONU transmits to one channel, it may be more efficient to use less expensive, temperature-sensitive transmitters and manage any wavelength drift that may result, as described above and further below. Also, as discussed further below, in particular embodiments, signal processing module 116 of OLT 110 may encourage wavelength drift. To do so, signal processing module 116 may, for example, communicate with heaters (or coolers) at ONUs 140 to change the ONU's or transmitter's temperature to encourage the wavelength at which the ONU 140 transmits to drift. OLT 110 may encourage wavelength drift for a variety of reasons. For example, OLT 110 may encourage wavelength drift to distribute bandwidth equally among ONUs 110, to distribute greater bandwidth to a premium subset of ONUs 110, or to encourage ONUs 110 to move from malfunctioning channels to operating channels.

As described further below in conjunction with the example embodiment illustrated in FIG. 3, ONUs 140a and 140b each have a transmitter emitting in a wavelength band that, if operated within a particular specified ambient temperature range, might overlap all or part of channels 1 and 2 (corresponding to wavelength bands $\lambda_1$ and $\lambda_2$), ONU 140c has a transmitter that might emit in a wavelength band that overlaps all or part of channel 2 and other unspecified channel (s), and ONU 140N has a transmitter that might emit in a wavelength band that overlaps all or part of channels M−1 and M. It should be noted that, in particular embodiments, only a single ONU 140 in topology 100 may have a wavelength band that overlaps all or part of two or more channels. In alternative embodiments, more than one ONU 140 may have a wavelength band that overlaps all or part of two or more channels. As an example only, all ONUs 140 may use the same type of transmitter with the same wavelength band, and this wavelength band may overlap all or part of two or more channels. In further alternative embodiments, the centers of the transmit wavelength bands may be distributed following a specific probability density function with wavelength bands that may overlap with multiple channels.

In operation of particular embodiments, switch 112 of OLT 110 receives network traffic from one or more network devices (not illustrated) via port 111. Switch 112 routes the network traffic to the one or more transmitter(s) 114. Transmitter(s) 114 receive the traffic from switch 112 and other routing information, such as upstream bandwidth allocation map(s), from signal processing module 116 and transmit the traffic and upstream bandwidth allocation map(s) to distributor 130 via port 127. Distributor 130 receives the signal from OLT 110 and distributes that signal or particular components of that signal to all or a subset of ONUs 140. Each ONU 140 receives and processes the received signal, including any upstream bandwidth allocation maps forwarded by OLT 110.

In the upstream direction, ONUs 140 transmit traffic to OLT 110 (via combiner 132) based on, for example, the received upstream bandwidth allocation maps. At least one ONU 140 transmits upstream traffic within a particular wavelength band that extends beyond the channel assigned to that ONU 140 by OLT 110, allowing the wavelength at which that ONU transmits to drift from the assigned channel to one or more non-assigned channels. Combiner 132 receives traffic in the potential plurality of channels from ONUs 140, combines the traffic into one signal, and forwards the signal to OLT 110.

Demultiplexer 126 of OLT 110 receives the signal from combiner 132 (via port 128) and demultiplexes the signal into its constituent channels, which correspond to the output ports of demultiplexer 126. Demultiplexer 126 forwards any portion of the signal in the first channel to receiver 124a, any portion of the signal in the second channel to receiver 124b, and so on. Receivers 124a-124M receive traffic in the different channels from demultiplexer 126, process the received traffic, and forward the processed traffic information to switch 112 and signal processing module 116.

Switch 112 receives the traffic from each receiver 124 and forwards the traffic to one or more upstream network devices (not illustrated) via port 111. Signal processing module 116 also receives traffic information from receivers 124. Using stored information in reachability table 118, drift analyzer 120 of signal processing module 116 then determines whether, for one or more of ONUs 140, its traffic has drifted to a non-assigned channel and identifies the ONU 140 whose traffic has drifted and the new channel in which that ONU 140 is transmitting. After identifying the ONU 140 whose traffic has drifted and the new channel in which that ONU 140 is transmitting, drift analyzer 120 uses this information to assign that ONU 140 to that channel/receiver in reachability table 118. Based on this updated information, DBA engine(s) 122 generate one or more upstream bandwidth allocation maps and forwards these map(s) and any other suitable information to transmitter(s) 114. Transmitter(s) 114 use this information as discussed above. In this manner, wavelength drift can be managed effectively.

Modifications, additions, or omissions may be made to the example systems and methods described without departing from the scope of the invention. The components of the example methods and systems described may be integrated or separated according to particular needs. Moreover, the operations of the example methods and systems described may be performed by more, fewer, or other components.

Figure 3:
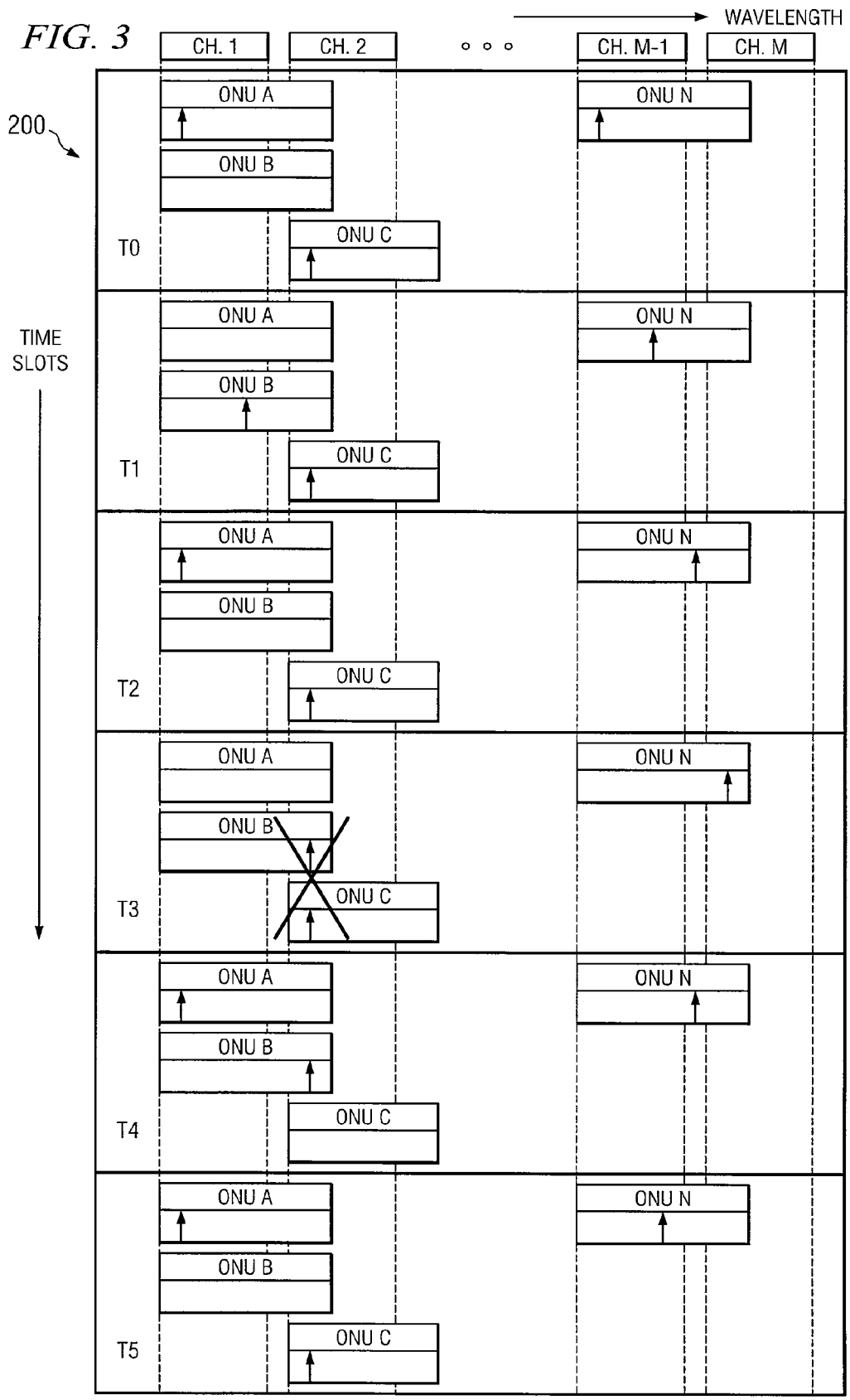
FIG. 3 is a diagram illustrating example management of wavelength drift of the upstream wavelengths of FIG. 2 across channels for timeslots $T_0$-$T_5$.

FIG. 3 is a diagram illustrating example management of wavelength drift of the upstream wavelengths of FIG. 2 across channels for timeslots $T_0$-$T_5$. Timeslots $T_0$-$T_5$ are illustrated one below the other in FIG. 3 and represent successive example timeslots in which ONUs 140 of topology 100 transmit upstream traffic. Channels 1-M are illustrated from left to right at the top of the diagram and represent the channels in topology 100 and the wavelength range over which a signal can be received by each corresponding receiver. In the example, in the transition region between two adjacent channels a signal may be received by two receivers simultaneously. The rectangles in each timeslot represent the wavelength bands over which each example ONU 140a, 140b, 140c, and 140N could transmit. An arrow in an ONU wavelength band represents that that ONU 140 is transmitting upstream traffic in that timeslot at that particular wavelength point in the band. An "X" represents that two or more ONUs 140 are transmitting upstream traffic in the same channel in the same timeslot, resulting in a collision of traffic.

In the illustrated embodiment, the wavelength bands for ONUs 140a, 140b, 140c, and 140N each spans more than one channel. For example, the wavelength bands of ONUs 140a and 140b each overlaps all or part of channels 1 and 2. The wavelength band of ONU 140c overlaps all or part of channel 2 and other unspecified channel(s). The wavelength band of ONU 140N overlaps all or part of channels M−1 and M. When an ONU's wavelength band overlaps all or part of two or more channels, the ONU's transmitter can transmit in any one of the channels over which its band overlaps. The ONU's transmitter may be manufactured to transmit in one channel at, for example, a certain temperature, but the wavelength at which the transmitter transmits may drift into another channel if, for example, the ONU's ambient temperature changes. It should be noted that the alignment of the edges of the bands (and the other features) illustrated in FIG. 3 is an example only.

In timeslots $T_0$-$T_2$, ONUs 140a and 140b time-share transmission in channel 1. As part of that time-sharing of channel 1, in the illustrated embodiment, only ONU 140a transmits during timeslot $T_0$, only ONU 140b transmits during timeslot $T_1$, and only ONU 140a transmits during timeslot $T_2$. Also in timeslots $T_0$-$T_2$, ONU 140c transmits in channel 2 during each of the timeslots and does not time-share transmission in that channel. Further during timeslots $T_0$-$T_2$, ONU 140N transmits in channel M−1 and does not time-share transmission in that channel. No ONU 140 transmits in channel M during timeslots $T_0$-$T_2$ in the illustrated embodiment.

Figure 4:
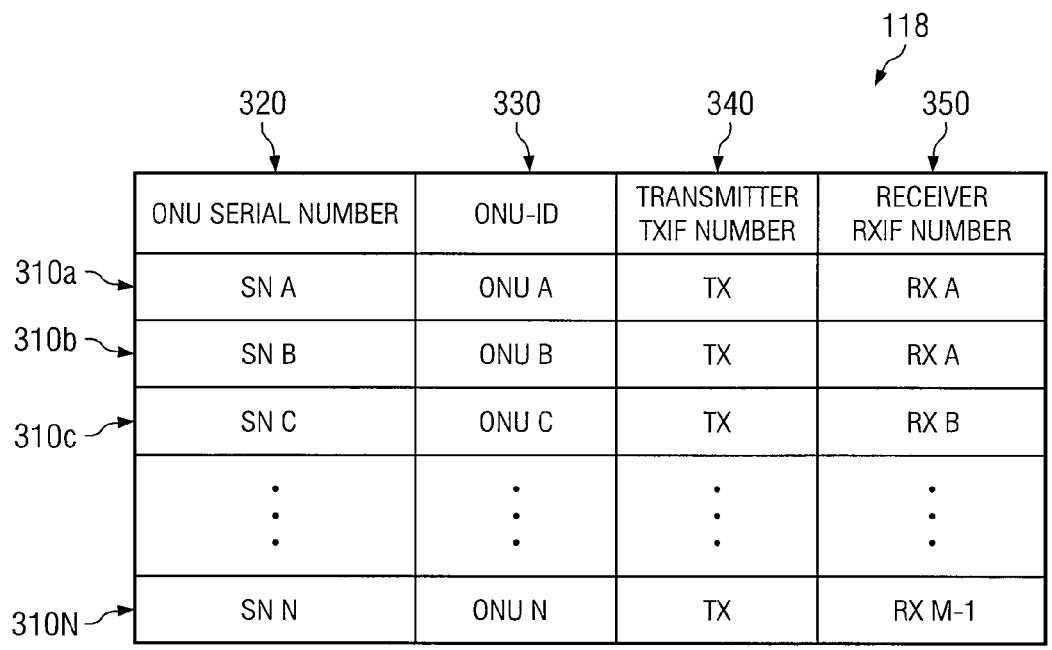
FIG. 4 is a diagram illustrating the example reachability table of FIG. 2 for timeslots $T_0$-$T_2$ of FIG. 3.

FIG. 4 is a diagram illustrating the example reachability table 118 of FIG. 2 for timeslots $T_0$-$T_2$ of FIG. 3. Each row 310 includes reachability information for a particular ONU 140. For example, row 310a includes reachability information for ONU 140a. Row 310b includes reachability information for ONU 140b, and so on. Column 320 includes an ONU's serial number (e.g., "SN A" through "SN N"), which is an identifier unique to each ONU 140 assigned by the ONU manufacturer. Column 330 includes an ONU's ID (e.g., "ONU A" through "ONU N"), which is an identifier of each ONU 140 assigned by OLT 110. Column 340 includes an OLT transmitter interface's (TXIF) identifier, which is an identifier of the OLT transmitter 114 that OLT 110 has assigned to transmit traffic to the ONU 140. Column 350 includes a receiver interface's (RXIF) identifier, which is an identifier of the OLT receiver 124 that OLT 110 has identified as receiving traffic from the ONU 140 (i.e., the channel that has been assigned to the ONU 140 for upstream transmission).

For timeslots $T_0$-$T_2$, drift analyzer 120 of OLT 110 has identified receiver 124a as receiving traffic from ONUs 140a and 140b (in channel 1) and has assigned that receiver to ONUs 140a and 140b in table 118. For these same timeslots, drift analyzer 120 has identified receiver 124b as receiving traffic from ONU 140c (in channel 2) and has assigned that receiver to ONU 140c in table 118. For timeslots $T_0$-$T_2$, drift analyzer 120 has also identified receiver 124M−1 as receiving traffic from ONU 140N (in channel M−1) and has assigned that receiver to ONU 140N in table 118.

DBA engine(s) 122 of OLT 110 use the assignments in reachability table 118 to generate upstream bandwidth allocation maps for suitable upstream transmission. For example, because there are two ONUs 140a and 140b assigned to receiver 124a, the generated upstream bandwidth allocation map allocates different upstream time-slots for transmission by each ONU 140a and 140b in channel 1, to avoid collisions. Because there is only a single ONU 140c assigned to receiver 124b, the generated upstream bandwidth allocation map allocates every time-slot for transmission by ONU 140c in channel 2. Similarly, because there is only a single ONU 140N assigned to receiver 124M−1, the upstream bandwidth allocation map allocates every time-slot for transmission by ONU 140N in channel M−1.

Referring back to FIG. 3, by timeslot $T_3$, the wavelength at which ONU 140b transmits has drifted across the transmitter's wavelength band from channel 1 to channel 2 due to, for example, a shift in ONU temperature. Because OLT 110 has allocated timeslot $T_3$ to ONU 140b for transmission in channel 1, ONU 140b transmits in that timeslot, but in the non-assigned channel 2 to which its traffic has drifted. This leads to a collision in traffic because ONU 140c also transmits in channel 2 in that timeslot, as OLT 110 had allocated. As described below in conjunction with FIG. 5, drift analyzer 120 of OLT 110 identifies drifted ONU 140b and reassigns it to channel 2 in reachability table 118. DBA engine(s) 122 of OLT 110 then uses the updated information in table 118 to generate an upstream bandwidth allocation map that allocates timeslots in channel 2 to ONU 140b (and no longer allocates timeslots in channel 1 to ONU 140b). For example, the map may allocate timeslots to ONUs 140b and 140c in channel 2 for time-shared transmission in that channel. The map may allocate all timeslots in channel 1 to ONU 140a, the only ONU now transmitting in that channel after the drift.

Also by timeslot $T_3$, the wavelength transmitted by ONU 140N has drifted across the transmitter's wavelength band from channel M−1 to channel M due to, for example, a shift in the ONU's temperature. Because OLT 110 has allocated that timeslot to ONU 140N for transmission in channel M−1, ONU 140N transmits in that timeslot, but in the non-assigned channel M to which its traffic has drifted. Because OLT 110 has not assigned timeslot $T_3$ to any other ONU 140 for transmission in channel M, a collision in traffic does not occur. However, as described below in conjunction with FIG. 5, drift analyzer 120 of OLT 110 nonetheless identifies drifted ONU 140N and assigns it to channel M in reachability table 118. DBA engine(s) 122 of OLT 110 then uses the updated information in table 118 to generate an upstream bandwidth allocation map that allocates timeslots to ONU 140N in channel M. For example, the map may allocate all timeslots in channel M to ONU 140N and no timeslots in channel M−1 to any ONU 140. In this manner, OLT 110 manages wavelength drift effectively.

Figure 5:
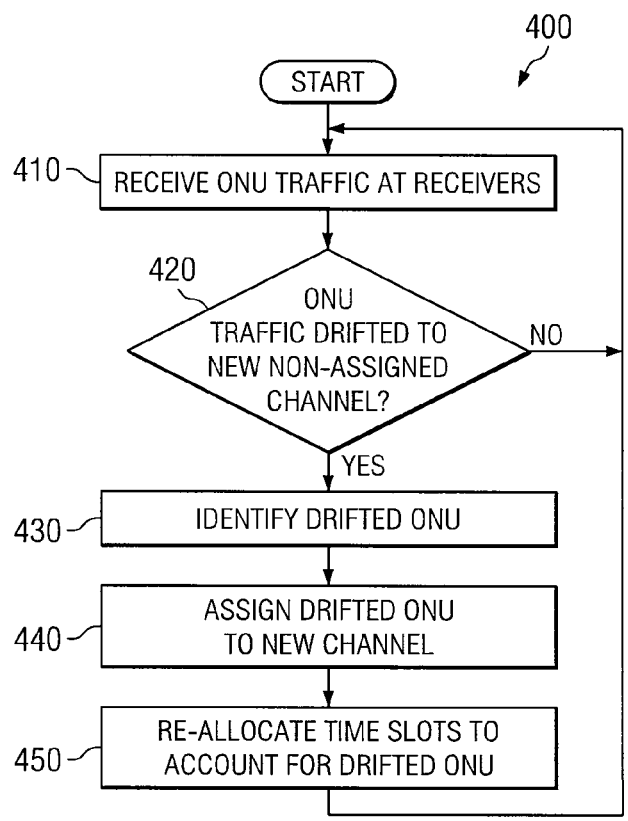
FIG. 5 is a flowchart illustrating a method to manage the wavelength drift of FIG. 3 according to a particular embodiment of the invention.

FIG. 5 is a flowchart illustrating a method 400 to manage the wavelength drift of FIG. 3 according to a particular embodiment of the invention. At step 410, OLT receivers 124 receive traffic from ONUs 140 and forward the traffic to signal processing module 116. At step 420, drift analyzer 120 of signal processing module 116 determines whether the wavelength at which an ONU transmits has drifted to a new (non-assigned) band. Drift analyzer 120 may, for example, determine that an ONU's traffic has drifted to a non-assigned channel, at least in part, after detecting noise from a particular OLT receiver 124 (i.e., a collision in a channel) and/or after detecting the absence of traffic in a channel for a timeslot assigned to an ONU 140. For example, for timeslot $T_3$ of FIG. 3, drift analyzer 120 may determine that the wavelength at which an ONU 140 transmits has drifted after detecting noise from receiver 124b (i.e., a collision in channel 2) and/or after detecting the absence of traffic from receiver 124a (i.e., in channel 1), to which ONU 140b had been allocated transmission in that timeslot. If drift analyzer determines that an ONU's traffic has drifted to a non-assigned channel, method 400 proceeds to step 430. If drift analyzer determines that no wavelength drift has occurred, method 400 returns to step 410.

At step 430, drift analyzer 120 identifies the ONU 140 whose traffic has drifted to a non-assigned channel. Drift analyzer 120 may do so, for example, by determining that no traffic was transmitted in a channel that had been assigned to an ONU 140 for that timeslot and identifying that ONU 140. Drift analyzer 120 may use bandwidth allocation map information and/or reachability table information to make these determinations. In particular embodiments, drift analyzer 120 may determine that the traffic transmitted by the ONU 140 that did not transmit in its assigned channel in the timeslot has drifted to a different channel (i.e., the one in which the collision occurred).

For example, for timeslot $T_3$ of FIG. 3, drift analyzer 120 may detect a collision in channel 2 and determine, using the information in reachability table 118 and bandwidth allocation map information, that channel 1 was assigned to ONU 140b for that timeslot but did not carry traffic. Drift analyzer 120 may then determine that the wavelength of ONU 140b has drifted from channel 1 to channel 2. It should be noted that in alternative embodiments, the method to determine the ONU 140 with the drifted wavelength may be more complex and may involve, for example, statistical probabilities that a certain ONU's wavelength has drifted. These statistical probabilities may be based on factors such as, for example, the proximity of the ONU's assigned channel to the channel with the collision, an ONU's historical drift characteristics, and/or other suitable factors.

Alternatively, in steps 420 and 430, drift analyzer 120 may determine that an ONU is transmitting in a non-assigned channel and may identify that ONU 140 and the channel, at least in part, after detecting traffic from that ONU 140 (by detecting, e.g., that ONU's identifiers in the traffic) in a channel to which that ONU 140 was not assigned. For example, for timeslot $T_3$ of FIG. 3, drift analyzer 120 may determine that ONU 140N is transmitting in a non-assigned channel after detecting traffic from ONU 140N in channel M, which was not assigned to ONU 140N. Method 400 may then proceed to step 440.

At step 440, drift analyzer 120 assigns, in reachability table 118, the ONU 140 transmitting in the non-assigned channel to the channel in which that ONU 140 is now transmitting. For example, for timeslot $T_3$ of FIG. 3, drift analyzer 120 assigns channel 2 to ONU 140b and channel M to ONU 140N in reachability table 118. At step 450, DBA engine(s) 122 use the updated information in reachability table 118 to generate upstream bandwidth allocation maps that allocate timeslots in channels to ONUs 140. For example, DBA engine(s) 122 may generate upstream bandwidth allocation maps that allocate timeslots in channel 1 only to ONU 140a because the traffic of ONU 140b has drifted to channel 2. The upstream bandwidth allocation maps may also allocate timeslots in channel 2 to ONUs 140b and 140c for time-shared transmission in that channel. The upstream bandwidth allocation maps may further allocate timeslots in channel M−1 to no ONUs 140 because the traffic of ONU 140N has drifted to channel M (and no other ONUs 140 transmit in channel M−1). Also, the upstream bandwidth allocation maps may allocate timeslots in channel M only to ONU 140N. After step 450, method 400 returns to step 410.

Modifications, additions, or omissions may be made to the example systems and methods described without departing from the scope of the invention. The components of the example methods and systems described may be integrated or separated according to particular needs. Moreover, the operations of the example methods and systems described may be performed by more, fewer, or other components.

FIG. 6 is a diagram illustrating the example reachability table 118 of FIG. 2 for timeslot $T_3$ of FIG. 3 after wavelength drift has been managed according to the method 400 of FIG. 5. As is illustrated, after the traffic that has drifted to non-assigned channels in timeslot $T_3$ has been managed, drift analyzer 120 of OLT 110 continues to assign ONU 140a to receiver 124a, which receives traffic in channel 1. Drift analyzer 120 has reassigned ONU 140b to receiver 124b, which receives traffic in channel 2. Drift analyzer 120 continues to assign ONU 140c to receiver 124b, which is now shared by ONU 140b. Drift analyzer 120 has reassigned ONU 140N to receiver 124M, which receives traffic in channel M.

Referring back to FIG. 3, in timeslot $T_4$, the wavelengths at which ONUs 140 transmit do not drift to non-assigned channels. Based on this absence of drift to non-assigned channels and the updated upstream bandwidth allocation map, ONU 140a transmits in channel 1, ONU 140b transmits in channel 2 (time-sharing that channel with ONU 140c), no ONU transmits in channel M−1, and ONU 140N transmits in channel M. Also, reachability table 118 of OLT 110 is not updated.

It should be noted that in timeslot $T_4$ (as well as in timeslot $T_2$), the wavelength at which ONU 140N transmits does drift directly between channels M−1 and M. In particular embodiments, drift analyzer 120 of OLT 110 may not determine that this is a drift into a new channel because ONU 140N is still partly transmitting in its assigned channel. Thus, in these embodiments, drift analyzer 120 may not reassign ONU 140N to the new channel (to avoid possible collisions in the assigned channel in which it is still partly transmitting). In alternative embodiments, drift analyzer 120 may determine that this is a drift into a new channel because ONU 140N is partly transmitting in a non-assigned channel. Thus, in these alternative embodiments, drift analyzer 120 may reassign ONU 140N to the new channel (to avoid possible collisions in the new channel in which it is partly transmitting). In yet alternative embodiments, drift analyzer 120 may determine that ONU 140N is transmitting in both channels and may assign ONU 140N to both channels (to avoid possible collisions in either channel). To accommodate multiple channel assignments per ONU, table 118 may include additional column(s) to store secondary channel assignment information. Secondary channel assignment information may also be used, for example, to predict future drift or to analyze trends, or to document the wavelength range of individual ONU transmitters in the network over extended periods of time.

In timeslot $T_5$ of FIG. 3, the only ONU traffic that drifts to a non-assigned channel is the traffic transmitted by ONU 140N. Thus, based on this wavelength drift and the updated upstream bandwidth allocation map, ONU 140a transmits in channel 1 and ONU 140c (and not ONU 140b) transmits in channel 2. Although the updated upstream bandwidth allocation map has allocated ONU 140N a timeslot in channel M, because the wavelength at which ONU 140N transmits has drifted, ONU 140N instead transmits in channel M−1. The drift into the non-assigned channel can be analyzed according to method 400 of FIG. 5, as discussed below.

At step 410 of method 400, OLT receiver 124M−1 receives traffic from ONU 140N and forwards the traffic to signal processing module 116. At steps 420 and 430, drift analyzer 120 of signal processing module 116 determines that the wavelength at which ONU 140N transmits has drifted after detecting traffic from ONU 140N in channel M−1, which was not assigned to ONU 140N based on information in table 118. At step 440, drift analyzer 120 assigns channel M−1 to ONU 140N in reachability table 118. Drift analyzer 120 does not update the records for the other ONUs 140 because their traffic has not drifted to non-assigned channels. At step 450, DBA engine(s) 122 generate upstream bandwidth allocation maps that allocate timeslots in the same manner as before, except as to channels M−1 and M. With respect to these two channels, DBA engine(s) 122 allocate timeslots in channel M−1 only to ONU 140N because no other ONU 140 transmits in that channel. DBA engine(s) 122 allocates timeslots in channel M to no ONU 140 because no ONU 140 now transmits in channel M.

FIG. 7 is a diagram illustrating the example reachability table of FIG. 2 for timeslot $T_5$ of FIG. 3 after wavelength drift has been managed according to the method of FIG. 5. As is illustrated, after the wavelength drift occurring in timeslot $T_5$ has been managed, drift analyzer 120 continues to assign ONU 140a to receiver 124a, which receives traffic in channel 1. Drift analyzer 120 also continues to assign ONUs 140b and 140c to receiver 124b, which receives traffic in channel 2.

However, drift analyzer 120 has now reassigned ONU 140N to receiver 124M−1, which receives traffic in channel M−1.

It should be noted that, in particular embodiments, as discussed above, node 20*a* of FIG. 1 and/or OLT 110 of FIG. 2 may manage wavelength drift to non-assigned (or newly assigned) channels by encouraging this drift. One or more components of node 20*a* or OLT 110, such as, for example signal processing modules 26 or 116, respectively, may encourage drift by, for example, affecting the temperature at which the downstream node transmitters or ONU transmitters transmit traffic. For example, in particular embodiments, OLT 110 may be communicatively coupled to heaters (and/or coolers) near the ONUs 140 that may increase or decrease the ONUs' temperatures, thereby encouraging the wavelengths at which they transmit to drift to non-assigned (or newly assigned) channels.

In particular embodiments, OLT 110 may encourage wavelength drift to distribute the WDM traffic (or a particular subset of premium WDM traffic) over a different (including, e.g., a greater) number of available channels. For example, before timeslot $T_3$ of FIG. 3, the users of ONU 140*a* may have upgraded their service to a premium package that offers increased bandwidth. OLT 110 may provide the increased bandwidth by causing non-premium ONU 140*b* to drift to channel 2 and share that channel with non-premium ONU 140*c*. In alternative embodiments, OLT 110 may encourage drift, for example, when a particular channel is disrupted and ONUs 140 cannot transmit in that channel. In such circumstances, OLT 110 may cause the ONUs 140 that are assigned transmission in the disrupted channel to drift into other channels that are not disrupted. Any other suitable reason may exist to encourage drift.

Modifications, additions, or omissions may be made to the example systems and methods described without departing from the scope of the invention. The components of the example methods and systems described may be integrated or separated according to particular needs. Moreover, the operations of the example methods and systems described may be performed by more, fewer, or other components. It should also be noted that the example systems and methods may be modified in any suitable manner to manage wavelength drift of receiver channels (as opposed to wavelength drift of transmitters) by, for example, reassigning transmitters to the drifted receiver channels.

Although the present invention has been described with several embodiments, various changes and modifications may be suggested to one skilled in the art. It is intended that the present invention encompass such changes and modifications as fall within the scope of the appended claims.

What is claimed is:

1. A method for managing wavelength drift in an optical network, comprising:
    receiving traffic in one or more optical channels transmitted by one or more transmitters, each channel having successive timeslots, each transmitter assigned to transmit in a channel in allocated timeslots in the channel;
    determining whether the traffic received in a particular channel in a particular timeslot was transmitted by one of the transmitters that was not assigned to transmit in the particular channel by determining that the traffic received in the particular channel comprises noise;
    if the traffic in the particular channel was transmitted by one of the transmitters that was not assigned to transmit in the particular channel:
        identifying the transmitter that was not assigned to transmit but that did transmit in the particular channel by:
            determining that a transmitter was assigned to but did not transmit in another channel and was allocated the same timeslot in the other channel as the timeslot in which noise was received in the particular channel; and
            based at least in part on the determination that the transmitter did not transmit in the other channel in that allocated timeslot, determining that that transmitter is the transmitter that was not assigned to transmit but that did transmit in the particular channel;
        assigning the identified transmitter to transmit in the particular channel; and
        allocating timeslots in the particular channel to the identified transmitter; and
    encouraging a transmitter that was not assigned to transmit in the particular channel to transmit in the particular channel by affecting the temperature of the transmitter.

2. The method of claim 1, wherein assigning the identified transmitter to transmit in the particular channel comprises storing information in a table that associates the identified transmitter with the particular channel.

3. The method of claim 1, wherein allocating timeslots in the particular channel to the identified transmitter comprises generating a bandwidth allocation map that allocates timeslots in the particular channel among a plurality of transmitters, including the identified transmitter.

4. The method of claim 1, wherein allocating timeslots in the particular channel to the identified transmitter comprises generating a bandwidth allocation map that allocates timeslots in the particular channel only to the identified transmitter.

5. The method of claim 1, further comprising allocating timeslots in the channel to which the identified transmitter was originally assigned such that the identified transmitter is no longer allocated timeslots in that other channel.

6. The method of claim 1, wherein the identified transmitter is an optical network unit transmitter.

7. A node for managing wavelength drift in an optical network, the node comprising:
    a plurality of receivers configured to receive traffic in one or more optical channels transmitted by one or more transmitters, each channel having successive timeslots, each transmitter assigned to transmit in a channel in allocated timeslots in the channel;
    a signal processing module configured to:
        determine whether the traffic received in a particular channel in a particular timeslot was transmitted by one of the transmitters that was not assigned to transmit in the particular channel by determining that the traffic received in the particular channel comprises noise; and
        if the traffic in the particular channel was transmitted by one of the transmitters not assigned to transmit in the particular channel:
            identify the transmitter that was not assigned to transmit but that did transmit in the particular channel by:
                determining that a transmitter was assigned to but did not transmit in another channel and was allocated the same timeslot in the other channel as the timeslot in which noise was received in the particular channel; and
                based at least in part on the determination that the transmitter did not transmit in the other channel in that allocated timeslot, determining that that transmitter is the transmitter that was not assigned to transmit but that did transmit in the particular channel;
assign the identified transmitter to transmit in the particular channel; and
allocate timeslots in the particular channel to the identified transmitter; and
encourage a transmitter that was not assigned to transmit in the particular channel to transmit in the particular channel by affecting the temperature of the transmitter.

8. The node of claim 7, wherein assigning the identified transmitter to transmit in the particular channel comprises storing information in a table that associates the identified transmitter with the particular channel.

9. The node of claim 7, wherein allocating timeslots in the particular channel to the identified transmitter comprises generating a bandwidth allocation map that allocates timeslots in the particular channel among a plurality of transmitters, including the identified transmitter.

10. The node of claim 7, wherein allocating timeslots in the particular channel to the identified transmitter comprises generating a bandwidth allocation map that allocates timeslots in the particular channel only to the identified transmitter.

11. The node of claim 7, wherein the signal processing module is further configured to allocate timeslots in the channel to which the identified transmitter was originally assigned such that the identified transmitter is no longer allocated timeslots in that other channel.

12. The node of claim 7, wherein the identified transmitter is an optical network unit transmitter.

\* \* \* \* \*